(12) United States Patent  
Tinnakornsrisuphap et al.

(10) Patent No.: US 9,143,402 B2
(45) Date of Patent: Sep. 22, 2015

(54) SENSOR BASED CONFIGURATION AND CONTROL OF NETWORK DEVICES

(71) Applicant: QUALCOMM Incorporated, San Diego, CA (US)

(72) Inventors: Peerapol Tinnakornsrisuphap, San Diego, CA (US); Ashwin Swaminathan, San Diego, CA (US); Kiran K. Somasundaram, San Diego, CA (US); Bibhu Prasad Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 13/624,360

(22) Filed: Sep. 21, 2012

(65) Prior Publication Data
US 2013/0223279 A1    Aug. 29, 2013

Related U.S. Application Data

(60) Provisional application No. 61/603,230, filed on Feb. 24, 2012.

(51) Int. Cl.
    *H04L 12/24* (2006.01)
    *H04W 12/06* (2009.01)
    *H04W 84/12* (2009.01)

(52) U.S. Cl.
    CPC ........ *H04L 41/0809* (2013.01); *H04L 41/0806* (2013.01); *H04W 12/06* (2013.01); *H04W 84/12* (2013.01)

(58) Field of Classification Search
    USPC .................. 370/254, 255, 338; 709/203, 228; 455/41.1, 411
    See application file for complete search history.

(56) References Cited

U.S. PATENT DOCUMENTS 6,892,052 B2   5/2005   Kotola et al.
7,616,594 B2   11/2009  Roberts et al.
(Continued)

FOREIGN PATENT DOCUMENTS

EP    2071427 A2    6/2009
EP    2071800 A2    6/2009
(Continued)

OTHER PUBLICATIONS

"PCT Application No. PCT/US2013/027363 International Search Report", Sep. 18, 2013, 18 pages.
(Continued)

*Primary Examiner* — Awet Haile
(74) *Attorney, Agent, or Firm* — DeLizio Law, PLLC

(57) ABSTRACT

A mobile device, such as a smartphone or a tablet computer, can execute functionality for configuring a network device in a communication network and for subsequently controlling the operation of the network device with little manual input. The mobile device can detect, from the network device, sensor information that is indicative of configuration information associated with the network device. The mobile device can decode the received sensor information to determine the configuration information and can accordingly enroll the network device in the communication network. In response to determining to control the enrolled network device, the mobile device can capture an image of the network device and can use the captured image to unambiguously identify the network device. The mobile device can establish a communication link with the network device and can transmit one or more commands to vary operating parameters of the network device.

39 Claims, 10 Drawing Sheets

(56) References Cited

U.S. PATENT DOCUMENTS

| | | | |
|---|---|---|---|
| 7,940,732 B2 | 5/2011 | Lowry et al. | |
| 2006/0256074 A1 | 11/2006 | Krum et al. | |
| 2008/0203148 A1* | 8/2008 | Young | 235/375 |
| 2009/0224906 A1* | 9/2009 | Balgard et al. | 340/539.1 |
| 2011/0277023 A1 | 11/2011 | Meylemans et al. | |

FOREIGN PATENT DOCUMENTS

| | | |
|---|---|---|
| EP | 2096505 A1 | 9/2009 |
| WO | 2007001629 A2 | 1/2007 |
| WO | 2011139962 A1 | 11/2011 |
| WO | 2012016014 A1 | 2/2012 |
| WO | 2013126731 | 8/2013 |

OTHER PUBLICATIONS

Soriente C., "HAPADEP: Human-Assisted Pure audio device pairing", Internet Citation, Mar. 12, 2007, pp. 1-11, XP002482020, Retrieved from the Internet: URL:http://eprint.iac.org/2007/93.pdf [retrieved on May 28, 2009].

"Partial International Search Report—PCT/US2013/027363—ISA/EPO—Jun. 3, 2013", 5 pages.

Co-Pending U.S. Appl. No. 61/603,230, filed Feb. 24, 2014, 31 pages.

* cited by examiner

US 9,143,402 B2

SENSOR BASED CONFIGURATION AND CONTROL OF NETWORK DEVICES

RELATED APPLICATIONS

This application claims the priority benefit of U.S. Provisional Application No. 61/603,230 filed Feb. 24, 2012.

BACKGROUND

Embodiments of the inventive subject matter generally relate to the field of communication networks and, more particularly, to sensor based configuration and control of network devices.

Local area networks typically comprise a variety of network devices. For example, a home network can comprise different types of smart devices (e.g., smart appliances) and other suitable types of communication devices. A "smart" device typically refers to an electronic device (e.g., a home appliance such as a lighting device, a refrigerator, a heating/cooling unit, etc.) that can automatically monitor and adjust its operation to meet the needs and requirements of a user. The smart device may be wirelessly configured and controlled and may even communicate/coordinate with other smart devices.

SUMMARY

Various embodiments for sensor based configuration and control of network devices are disclosed. In one embodiment, a mobile device determines to configure a network device in a communication network. A sensor associated with the mobile device detects sensor information from the network device. The sensor information is indicative of configuration information associated with the network device. The configuration information is decoded based on the sensor information detected from the network device. The mobile device provides, to the network device, communication device credentials associated with an access point of the communication network to enable the network device to connect to the communication network via the access point based, at least in part, on the decoded configuration information.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
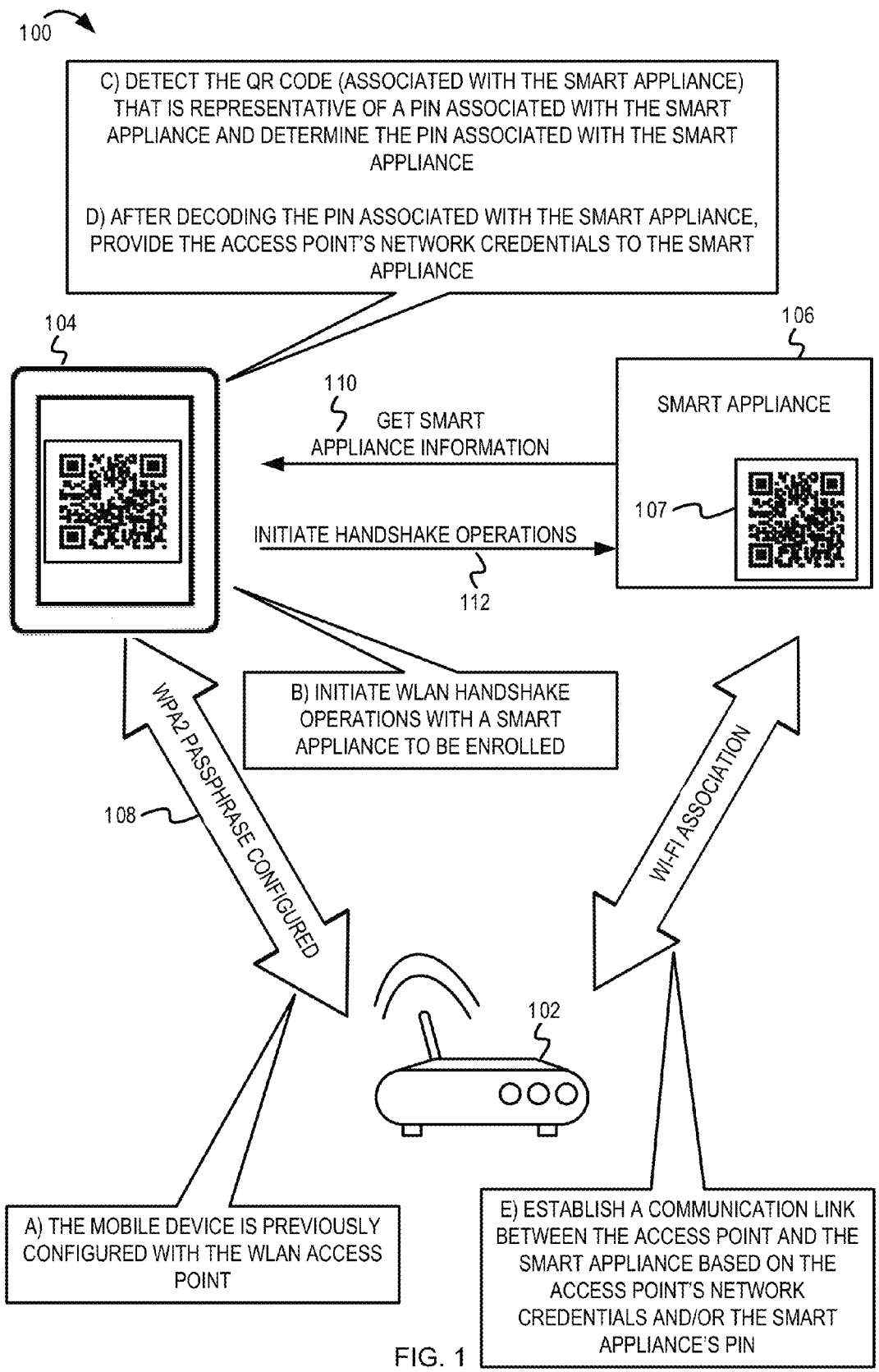
FIG. 1 is a conceptual diagram illustrating example operations for using a quick response (QR) code to configure a smart appliance.

The description that follows includes exemplary systems, methods, techniques, instruction sequences, and computer program products that embody techniques of the present inventive subject matter. However, it is understood that the described embodiments may be practiced without these specific details. For instance, although examples refer to operations for configuring and controlling smart appliances using wireless local area network (WLAN) technologies (e.g., IEEE 802.11x technologies), embodiments are not so limited. In other embodiments, the operations described herein can be executed using other suitable communication standards and technologies (e.g., powerline communication (PLC) technologies). In some embodiments, hybrid devices (in hybrid communication networks) that utilize two or more communication standards/protocols (e.g., a combination of WLAN, PLC, Ethernet, etc.) may also use the operations described herein for configuring and controlling smart appliances. Furthermore, although examples refer to operations for configuring and controlling smart appliances, in other embodiments the operations described herein can be executed to control and configure other suitable types of electronic network devices (e.g., home network devices, hybrid network devices, etc.). In other instances, well-known instruction instances, protocols, structures, and techniques have not been shown in detail in order not to obfuscate the description.

Smart appliances (e.g., smart lighting systems, smart thermostats, etc.) are typically configured and added to a home communication network (e.g., a home WLAN, a powerline network, etc.) before the smart appliances and their corresponding services can be utilized. For example, some networking protocols (e.g., Bonjour, universal plug and play (UPnP), etc.) may typically require the smart appliance to be connected to the local network (e.g., the home WLAN). Furthermore, WLAN connection setup procedures for connecting the smart appliance in the local network may require pre-configuration of security keys (e.g., a Wi-Fi protected access (WPA2) key). However, the smart appliances typically have little to no user input capability. Configuring and controlling the smart appliance via an Internet-based configuration page or via a panel of buttons/dials on the smart appliance can be difficult. This can make the process of configuring the smart appliances time consuming, complicated, expensive, and frustrating to users. Existing techniques for configuring the smart appliance typically employ a static personal identification number (PIN) method or a push button method to initiate the WLAN connection procedures and to connect the smart appliance to an access point of the home network. However, the push-button may not be user-friendly, may break, and implementing the push-button on the smart appliances may increase the cost and size of the smart appliances. Furthermore, communications exchanged after the push button is activated may be susceptible to security and privacy issues (e.g., active eavesdroppers). The static PIN method may involve the user employing a computer or another communication device to input the PIN (e.g., because the access point and/or the smart appliance may not have a user input panel). The user may also lose/forget the predetermined static PIN or may select an easily compromised PIN; thus the static PIN method may be neither easy to implement nor secure.

In some embodiments, a smartphone or another user-friendly electronic device (e.g., a tablet computer) can implement functionality for securely configuring an enrollee (e.g., a smart appliance that is not currently part of a home network) with an access point and adding the enrollee to the home network with very little manual intervention. The smartphone can utilize a camera, a microphone, or another sensor device to detect light variations, audio variations, and/or other suitable sensor information from the enrollee. The smartphone (also referred to as "external registrar") can implement functionality to decode a personal identification number (PIN) associated with the enrollee from the sensor information detected by the sensor devices and then, securely provide network credentials to the enrollee. The enrollee can then access the home network (and the access point that controls the home network) using the network credentials for setup and configuration of the enrollee (e.g., to connect and configure the smart appliance using existing Wi-Fi protected setup (WPS) connection procedures). FIGS. 1-7 will describe example operations for using different sensor technologies to configure a smart appliance in a home network via a mobile device (also referred to as a portable device or a handheld device). As will be described below in FIGS. 8-9, the user can also use the smartphone (or another user-friendly electronic device) to identify a previously enrolled smart appliance, connect to the smart appliance, and control the smart appliance. Such a technique for configuring and controlling smart appliances can be easy to use. This technique can also improve privacy and security associated with exchanging device credentials for establishing communication links. Furthermore, the smart appliances need not be active all the time as the user can connect to the smart appliance when he/she needs to control the smart appliance or change its current operating state. This can further reduce power consumption of the smart appliance and the home network.

FIG. 1 is a conceptual diagram illustrating example operations for using a quick response (QR) code to configure a smart appliance. In one embodiment as depicted in FIG. 1, a home network 100 comprises a WLAN access point 102, a mobile device 104, and a smart appliance 106 (i.e., the enrollee). The enrollee 106 may be a smart light source (e.g., a smart light bulb), a smart refrigerator, a smart sound system, or another suitable smart appliance. The enrollee 106 is associated with a QR code 107. It should be understood that in other embodiments the enrollee 106 can be associated with a barcode or another suitable encoded image, text, etc. The QR code 107 may be positioned on the exterior of the smart appliance 106 so that the mobile device 104 can be easily used to scan and detect the QR code 107 associated with the smart appliance 106. The mobile device 104 may be a smartphone, a tablet computer, a laptop computer, a wearable computer, or another suitable mobile (or handheld) electronic device configured to execute functionality described herein. The mobile device 104 acts an intermediary device (also referred to as an "external registrar") between the enrollee 106 and the WLAN access point 102 and assists the enrollee 106 in connecting to the home network 100 governed by the WLAN access point 102.

In this embodiment at stage A, it is assumed that the mobile device 104 (i.e., the external registrar) is already connected in the home network 100, can communicate with the WLAN access point 102, and therefore, has knowledge of the requisite device/network credentials (e.g., a Wi-Fi protected access (WPA2) key 108) for communicating with the WLAN access point 102. To enroll the enrollee 106 in the home network 100, the mobile device 104 can first attempt to create a communication link (also referred to as a "binding") between the mobile device 104 and the enrollee 106. In the example of FIG. 1, the enrollee 106 can have WLAN communication capabilities and can advertise its presence by transmitting suitable advertising messages 110. Alternatively, the enrollee 106 may also listen to beacon or advertising messages from either the WLAN access point 102 or the mobile device 104. At stage B, the mobile device 104 can initiate handshake operations 112 (e.g., Wi-Fi direct handshake procedures) to establish the binding between the enrollee 106 and the mobile device 104. The enrollee 106 and the mobile device 104 can exchange one or more handshake messages to establish the binding between the enrollee 106 and the mobile device 104. At stage C, the mobile device 104 can detect the QR code 107 associated with the enrollee 106. As described above, the QR code 107 is representative of the PIN (or a device identifier, or other suitable configuration information) associated with the enrollee 106. For example, the user can use a camera of the mobile device 104 to take a picture of the QR code 107. A QR code decoding application executing on the mobile device 104 can decode the QR code 107 and can determine the enrollee's PIN from the QR code 107. As another example, the mobile device 104 can comprise a QR code scanner to scan the QR code 107 and to decode the QR code. It should also be understood that in other embodiments, the mobile device 104 may comprise a barcode scanner to scan and decode a barcode associated with the enrollee 106. After the mobile device 104 decodes the enrollee's PIN from the detected QR code 107, the mobile device 104 can enroll the smart appliance 106 with the WLAN access point 102. For example, at stage D, the mobile device 104 can provide network credentials associated with the WLAN access point 102 (e.g., a service set identifier (SSID) and a WPA2 passphrase) to the enrollee 106 to enable the enrollee 106 to identify and communicate with the WLAN access point 102. At stage E, the enrollee 106 can use the SSID and the WPA2 passphrase associated with the WLAN access point 102 to attempt to associate (and establish a communication link) with the WLAN access point 102. In some embodiments, the mobile device 104 can also provide the enrollee's PIN to the WLAN access point 102. Here, the WLAN access point 102 acts as an internal registrar.

Figure 2:
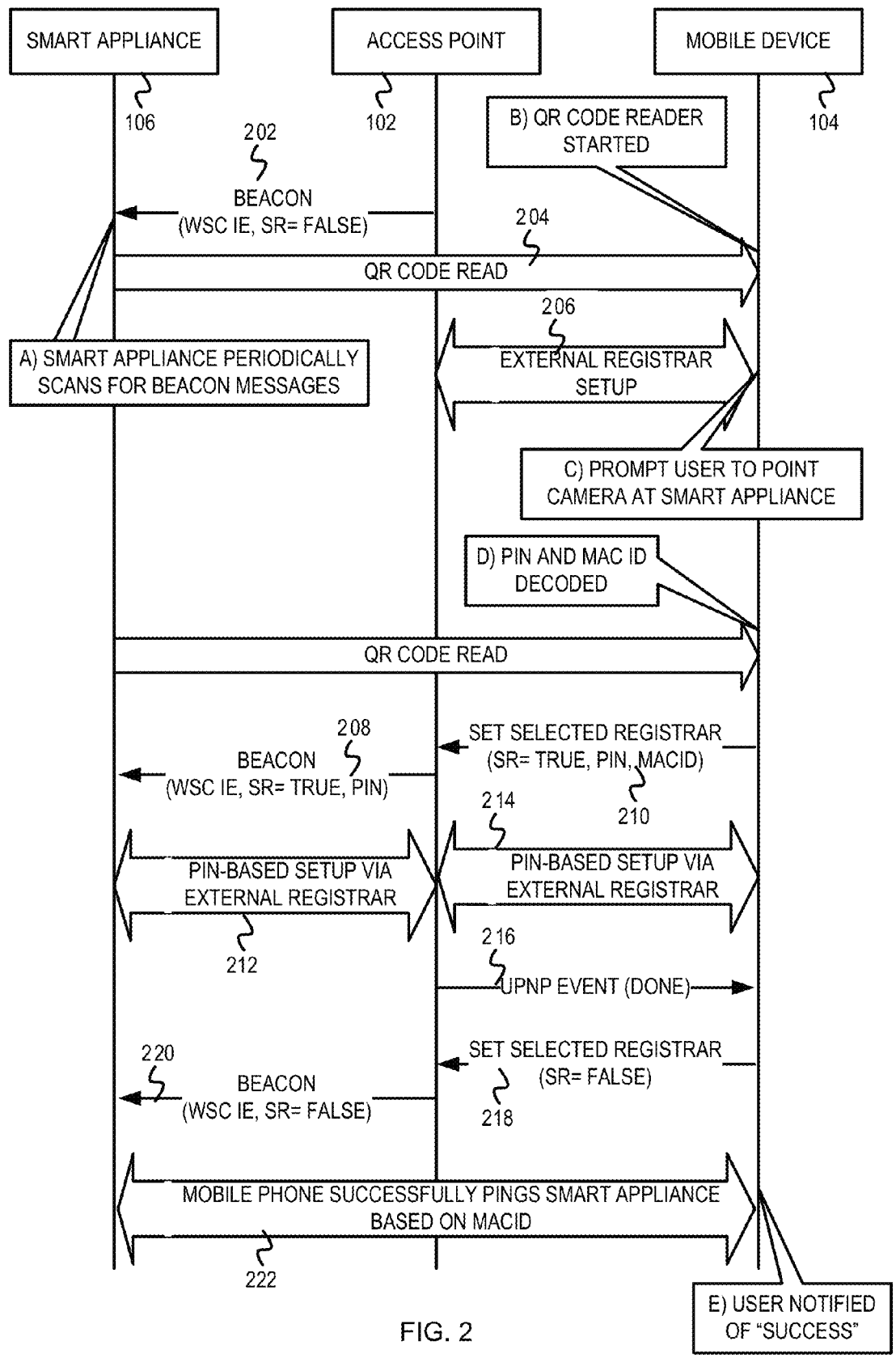
FIG. 2 is a message sequence diagram illustrating an example flow of messages between a smart appliance, an access point, and a mobile device while using a QR code to configure the smart appliance.

The operations described above with reference to FIG. 1 are executed when the mobile device 104 directly configures the enrollee 106 (e.g., the smart appliance). In other embodiments, the mobile device 104 can configure the enrollee 106 through the WLAN access point 102. In this embodiment, the mobile device 104 can act as an external registrar for the WLAN access point 102 as specified in Wi-Fi Simple Configuration (WSC) specification. Operations of the mobile device 104 using a QR code to configure a smart appliance 106 through the WLAN access point 102 are further illustrated in FIG. 2. FIG. 2 depicts a message sequence diagram illustrating an example flow of messages between the smart appliance 106, the access point 102, and the mobile device 104 while using a QR code to configure the smart appliance 106. At stage A, the smart appliance 106 (e.g., a configuration unit of the smart applicant 106) periodically scans for beacon messages from the access point 102. The smart appliance 106 (e.g., the configuration unit) receives a beacon message 202 from the access point 102. At stage B, the mobile device 104 starts its QR code reader (e.g., initializes an application for reading and decoding the QR code) and the mobile device 104 reads the QR code at stage 204 (e.g., when the user presses a button to indicate that the QR code should be captured). In response to the mobile device 104 reading the QR code associated with the smart appliance 106, the mobile device 104 and the access point 102 exchange one or more messages 206 for external registrar setup. For example, the mobile device 104 and the access point 102 can exchange one or more messages 206 to establish a communication link between the mobile device 104 and the access point 102 and to configure the mobile device 104 as an external registrar or an intermediary device between the smart appliance 106 and the access point 102. At stage C, after the mobile device 104 (i.e., the external registrar) is configured, the mobile device 104 can prompt the user (e.g., via a notification on a display panel) to point the mobile device's camera at the smart appliance 106 and to take a picture of the QR code associated with the smart appliance 106. At stage D, the mobile device 104 can decode a PIN, a medium access control identifier (MAC ID), other suitable device identifiers, and/or other suitable configuration information associated with the smart appliance 106. It is noted that in some embodiments, instead of or in addition to the PIN associated with the smart appliance 106, the mobile device 104 can decode a shared secret or password associated with the smart appliance 106. Furthermore, the mobile device 104 may also determine a checksum value to validate that the QR Code should be used for configuration of the smart appliance, a type of the smart appliance (e.g., whether the smart appliance is configured as a client station or an access point), a smart appliance name, a smart appliance description, a URL to enable the mobile device to download a device specific application or to access a device specific website, etc. from the QR code. In FIG. 2, after the PIN and the MAC ID associated with the smart appliance 106 are decoded, the mobile device 104 can transmit a message 210 to the access point 102 identifying itself as the external registrar and indicating at least the PIN and the MAC ID of the smart appliance 106. The access point 102, in turn, can transmit a beacon message 208 to the smart appliance 106 specifically referencing the smart appliance 106 by at least its MAC ID and indicates it wants to configure the appliance using the PIN (determined from the QR code). The smart appliance 106 (e.g., the configuration unit) and the access point 102 can then execute operations for a PIN-based communication link setup via the external registrar (i.e., via the mobile device 104) by exchanging messages 212 between the smart appliance 106 and the access point 102 and messages 214 between the mobile device 104 and the access point 102. After the communication link between the smart appliance 106 and the access point 102 is successfully established, the access point 102 can transmit a message 216 to the mobile device 104 indicating that the communication link with the smart appliance 106 was successfully established. The mobile device 104 can then transmit a message 218 to the access point 102 indicting that it is no longer the external registrar for the smart appliance 106. The access point 102 can further transmit a message 220 (e.g., a beacon message) to notify the smart appliance 106 that the mobile device 104 is no longer the external registrar. The mobile device 104 can then successfully communicate with (message 222) the smart appliance using the smart appliance's MAC ID. Finally, at stage E, the mobile device 104 can notify the user that the smart appliance 106 was successfully configured with the access point 102.

It is understood that although FIGS. 1 and 2 describe operations for configuring the smart appliance using a QR code, embodiments are not so limited. In other embodiments, the configuration operations described above could be executed using a three-dimensional barcode, two dimensional barcode, printed text recognizable via OCR, encoded images, or other suitable techniques.

Figure 3:
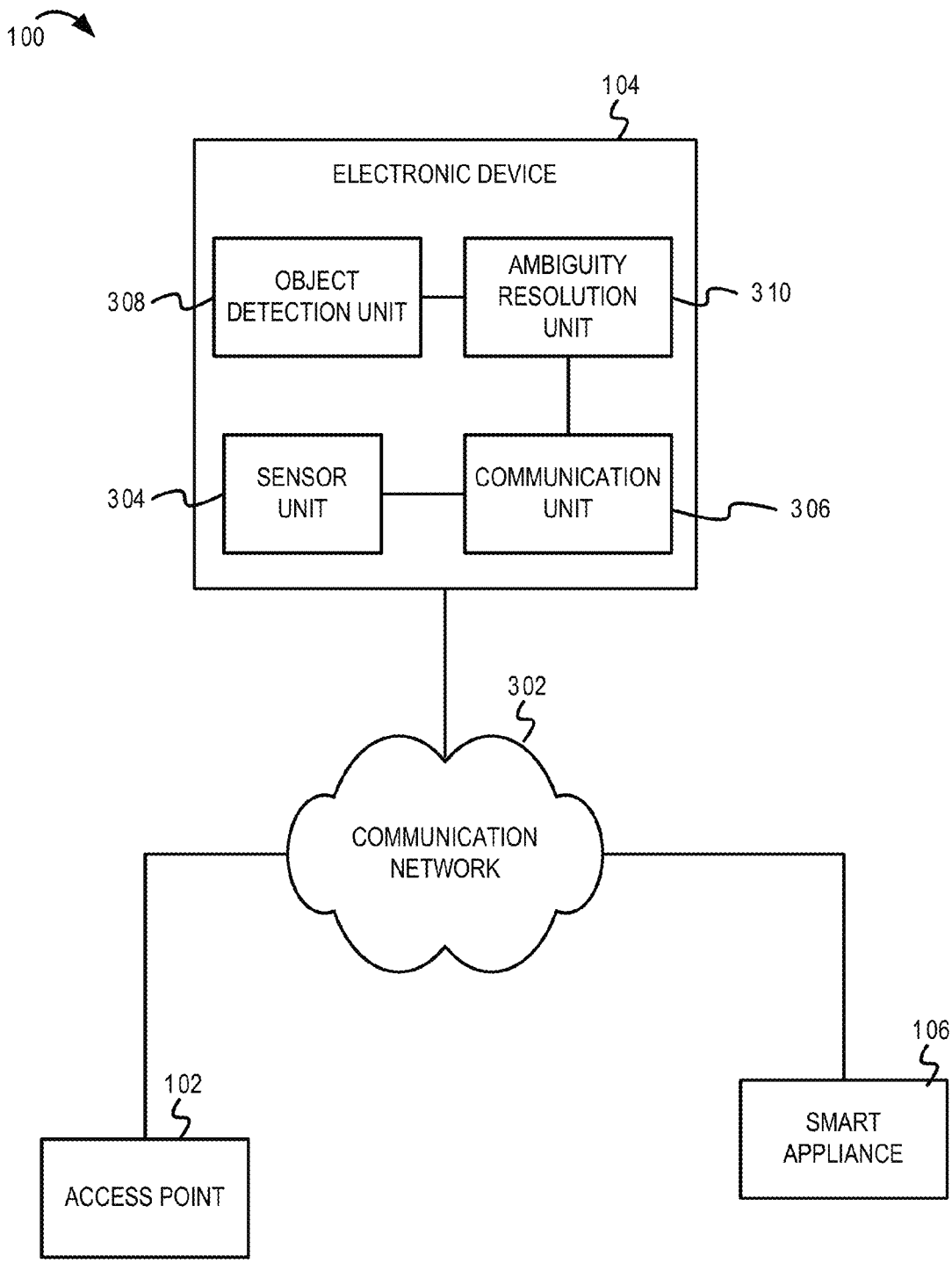
FIG. 3 is an example embodiment of a home network including a mobile device, a smart appliance, and an access point.

FIG. 3 depicts an example embodiment of the home network 100 including the mobile device 104 (e.g., a smartphone, a tablet computer, or another suitable handheld electronic device with sensors and communication capabilities), the smart appliance 106, and the access point 102. The mobile device 104, the smart appliance 106, and the access point 102 are communicatively coupled via a communication network 302 (e.g., a WLAN, a PLC network, a hybrid network, etc.). In one embodiment, the mobile device 104 comprises a sensor unit 304, a communication unit 306, an object detection unit 308, and an ambiguity resolution unit 310. The sensor unit 304 in conjunction with the communication unit 306 can receive the sensor information (e.g., the QR code 107 of FIG. 1), decode the sensor information to determine the device credentials (e.g., PIN, MAC ID, PLC key, etc.) associated with the smart appliance 106 and to enroll the smart appliance 106 with the access point 102, as described above with reference to FIGS. 1-2 and as will be further described below in FIGS. 4-7. The object detection unit 308, the ambiguity resolution unit 310, and the communication unit 306, in conjunction, can enable the user to connect to and control the enrolled smart appliance 106, as will be further described below with reference to FIGS. 8 and 9.

Figure 4:
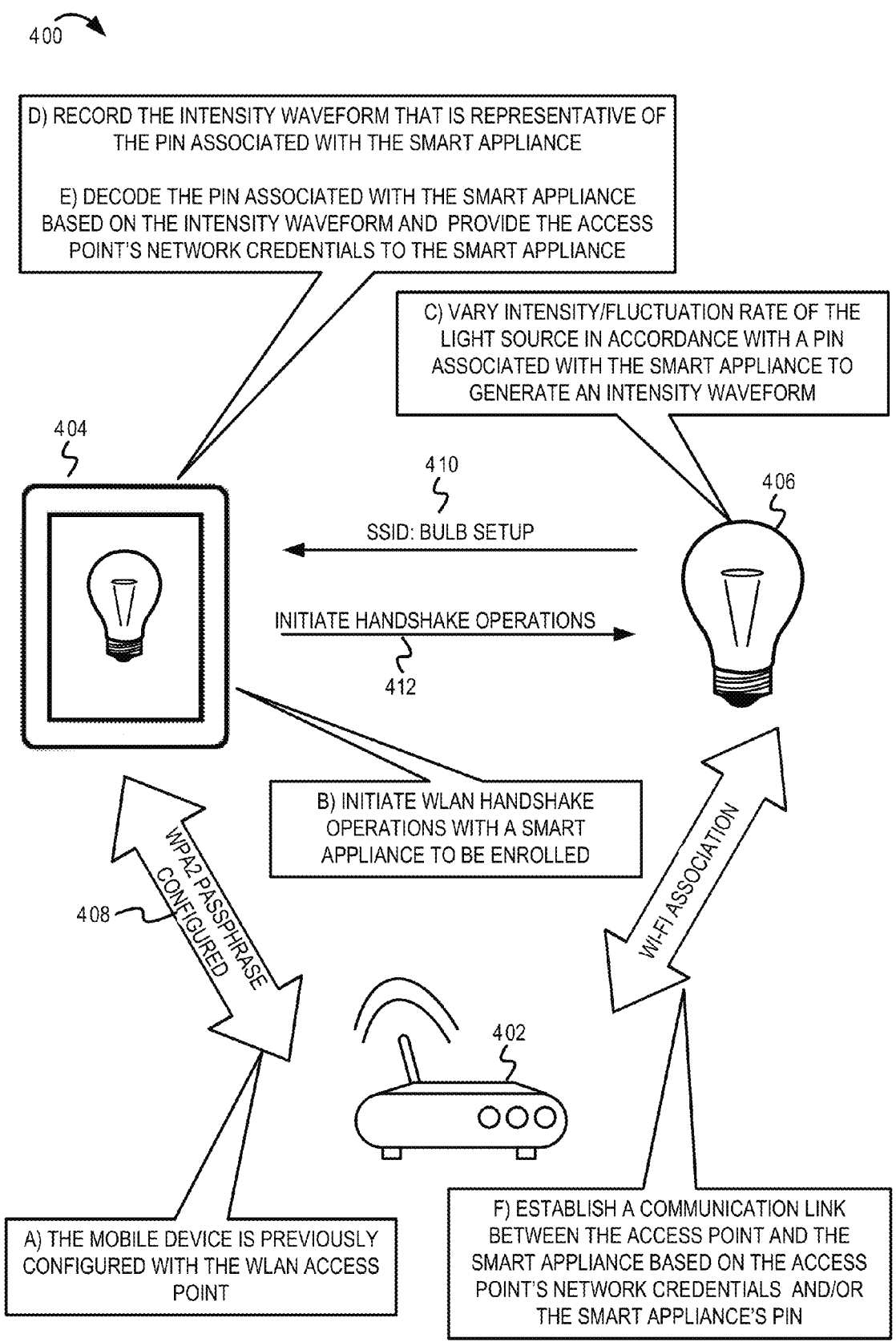
FIG. 4 is a conceptual diagram illustrating example operations for using Li-Fi technology to configure a smart appliance.

FIG. 4 is a conceptual diagram illustrating example operations for using Li-Fi technology to configure a smart appliance. FIG. 4 depicts a home network 400 that comprises a WLAN access point 402, a mobile device 404, and a smart appliance 406 with a light source. In the example of FIG. 4, the smart appliance 406 with the light source is the enrollee and the mobile device 404 acts as an external registrar between the enrollee 406 and the WLAN access point 402. The mobile device 404 can assist the enrollee 406 in connecting to the home network 400 governed by the WLAN access point 402. In this embodiment at stage A, it is assumed that the mobile device 404 is already connected in the home network 400, can communicate with the WLAN access point 402, and therefore, has knowledge of the requisite device/network credentials (e.g., the WPA2 passphrase 408) for communicating with the WLAN access point 402. In one embodiment as described above, the mobile device 404 and the enrollee 406 can exchange one or more handshake messages 410, 412 to establish a binding between the enrollee 406 and the mobile device 404 (at stage B). In the example of FIG. 4, the enrollee 406 can use light signals to communicate its PIN (and/or other device identifiers and configuration information) to the mobile device 404. This process by which light signals are used to transmit information is referred to as "Li-Fi technology." In some embodiments as depicted in FIG. 4, the enrollee 406 can be a smart light bulb or another smart light source. In other embodiments (not shown in FIG. 4), the enrollee 406 can be any suitable smart appliance that is coupled with a light source. For example, the enrollee 406 can be a smart refrigerator that is coupled with a light emitting diode (LED). In the example of FIG. 4, Li-Fi technology can be used to convert the PIN associated with the enrollee 406 to an intensity waveform that fluctuates over time based on the enrollee's PIN. At stage C, after the enrollee 406 is activated, the light source of the enrollee 406 can generate an intensity waveform that is representative of the enrollee's PIN. In one embodiment, the smart appliance 406 (e.g., a configuration unit) can generate the intensity waveform by blinking the light source associated with the smart appliance 406 in a predetermined pattern. In this embodiment, the duration for which the light source is switched on/off ("blink rate") may be determined based on the PIN associated with the smart appliance 406. In another embodiment, the smart appliance 406 (e.g., the configuration unit) can generate the intensity waveform by varying the brightness or intensity of the light source. In this embodiment, the level of brightness or the rate at which the brightness is varied may be based on the PIN associated with the smart appliance 406. At stage D, a suitable light sensor (e.g., a camera, a video recorder, etc.) on the mobile device 404 can detect/record the intensity waveform. In this embodiment, the detected intensity waveform is the sensor information received at the mobile device 404 and from the enrollee 406. The mobile device 404 (e.g., the sensor unit 304 of FIG. 3) can detect the fluctuations in the intensity waveform and can decode the PIN associated with the enrollee 406. In this embodiment, it is assumed that both the smart appliance 406 and the mobile device 404 execute the same operations for mapping between the light intensity and/or the blink rate to the PIN. After the mobile device 404 decodes the enrollee's PIN, the mobile device 404 (e.g., the communication unit 306 of FIG. 3) can enroll the enrollee 406 (e.g., the smart appliance 406 with the light source) with the WLAN access point 402. As described above, because the mobile device 404 is typically already connected to the home network 400, the mobile device 404 may have requisite network credentials (e.g., SSID, WPA2 passphrase information) for communicating with the WLAN access point 402. After the mobile device 404 decodes the enrollee's PIN and establishes a communication link (e.g., a Wi-Fi direct connection) with the enrollee 406, the mobile device 404 can provide (at stage E) the network credentials (e.g., the SSID and WPA2 passphrase information) associated with the WLAN access point 402 to the enrollee 406. At stage F, the enrollee 406 can use the SSID and WPA2 passphrase information to locate, connect to, associate with, and communicate with the WLAN access point 402. In some embodiments, the mobile device 404 (e.g., the communication unit 306 of FIG. 3) can also provide the enrollee's PIN to the WLAN access point 402.

Figure 5:
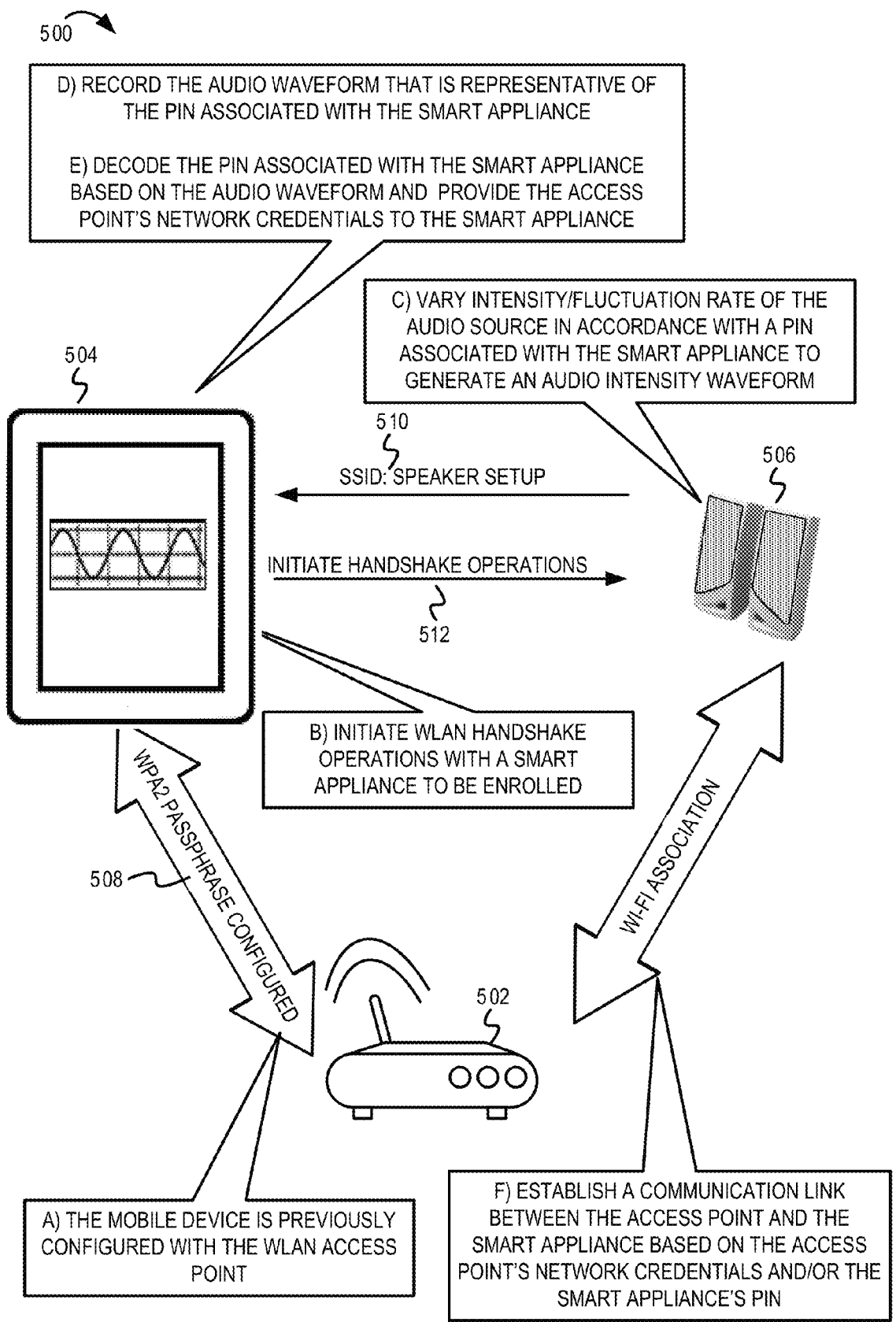
FIG. 5 is a conceptual diagram illustrating example operations for using audio signals to configure a smart appliance.

FIG. 5 is a conceptual diagram illustrating example operations for using audio signals to configure a smart appliance. FIG. 5 depicts a home network 500 that comprises a WLAN access point 502, a mobile device 504, and a smart appliance 506 with an audio source. In the example of FIG. 5, the smart appliance 506 with an audio source is the enrollee and the mobile device 504 acts as an external registrar between the enrollee 506 and the WLAN access point 502. The mobile device 504 can assist the enrollee 506 in connecting to the home network 500 governed by the WLAN access point 502. In this embodiment at stage A, it is assumed that the mobile device 504 is already connected in the home network 500, can communicate with the WLAN access point 502, and therefore, has knowledge of the requisite device/network credentials (e.g., the WPA2 passphrase 508) for communicating with the WLAN access point 502. In one embodiment as described above, the mobile device 504 and the enrollee 506 can exchange one or more handshake messages 510, 512 to establish a binding between the enrollee 506 and the mobile device 504 (at stage B). In the example of FIG. 5, the enrollee 506 can use ultrasound signals to communicate its PIN (and/or other device identifiers and configuration information) to the mobile device 504. In some embodiments as depicted in FIG. 5, the enrollee 506 can be smart speakers or another smart audio source. In other embodiments (not depicted in FIG. 5), the enrollee 506 can be another suitable smart appliance that is coupled with a suitable audio generating unit. For example, the enrollee 506 can be a smart refrigerator that is coupled with an audio source. In the example of FIG. 5, ultrasound technology can be used to convert the PIN associated with the enrollee 506 to an audio waveform that fluctuates over time based on the enrollee's PIN. At stage C, after the enrollee 506 is activated, the enrollee 506 (e.g., a configuration unit) can generate an audio waveform such that at least one audio waveform parameter (e.g., amplitude, frequency, phase, etc.) varies at a rate that is representative of the enrollee's PIN. In some embodiments, the audio waveform may be transmitted at a frequency that is not audible to the human ear. At stage D, a suitable audio sensor (e.g., a microphone) associated with the mobile device 504 can detect/record the audio waveform. In this embodiment, the detected audio waveform is the sensor information received at the mobile device 404 and from the enrollee 506. The mobile device 504 (e.g., the sensor unit 304 of FIG. 3) can detect the fluctuations in the audio waveform and can decode the PIN associated with the enrollee 506. After the mobile device 504 decodes the enrollee's PIN, the mobile device 504 (e.g., the communication unit 306 of FIG. 3) can enroll the enrollee 506 (e.g., the smart appliance 506 with the audio source) with the WLAN access point 502. As described above, because the mobile device 504 is typically already connected to the home network 500, the mobile device 504 may have requisite network credentials (e.g., SSID, WPA2 passphrase information) for communicating with the WLAN access point 502. After the mobile device 504 decodes the enrollee's PIN and establishes a communication link (e.g., a Wi-Fi direct connection) with the enrollee 506, the mobile device 504 can provide (at stage E) the network credentials (e.g., the SSID and WPA2 passphrase information) associated with the WLAN access point 502 to the enrollee 506. At stage F, the enrollee 506 can use the SSID and the WPA2 passphrase information to locate, connect to, associate with, and communicate with the WLAN access point 502. In some embodiments, the mobile device 504 (e.g., the communication unit 306) can also provide the enrollee's PIN to the WLAN access point 502.

Although in the examples of FIGS. 1-5, the access point, the mobile device, and the enrollee are WLAN-compatible devices; embodiments are not so limited. In other words, the access point, the mobile device, and the enrollee may not support a common communication technology. In other embodiments, the access point, the mobile device, and the enrollee may be part of a hybrid network (e.g., a hybrid WLAN-powerline communication (PLC) network) and may support different communication technologies, as will be described below in FIG. 6.

Figure 6:
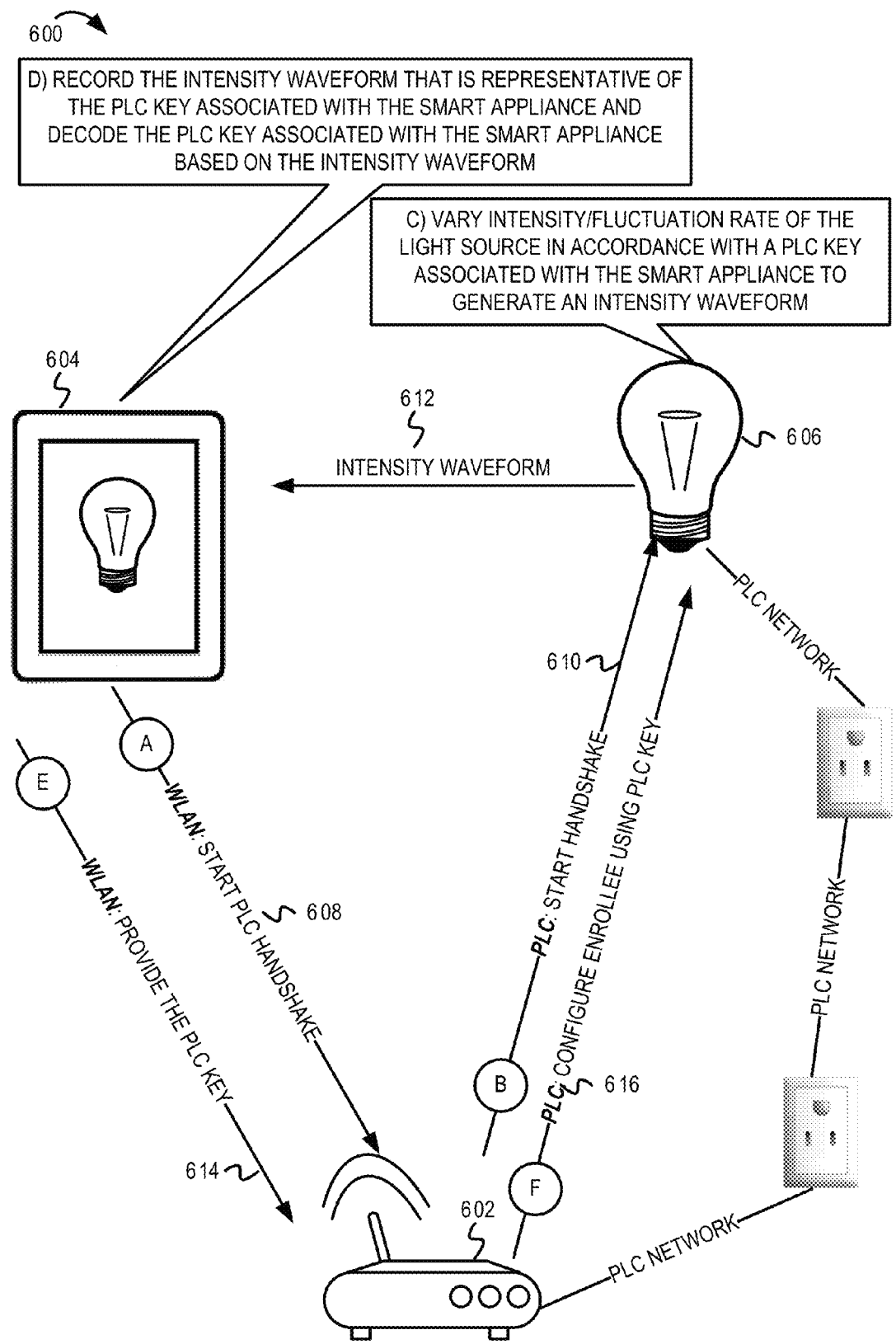
FIG. 6 is a conceptual diagram illustrating example operations for configuring a smart appliance in a hybrid communication network.

FIG. 6 is a conceptual diagram illustrating example operations for configuring a smart appliance in a hybrid communication network. FIG. 6 depicts a hybrid home network 600 that comprises a hybrid access point 602 (e.g., an IEEE 1905.1 device that is capable of both IEEE 1901 powerline communication and 802.11 WLAN communication), a WLAN-compatible mobile device 604, and a PLC-compatible smart appliance 606 with a light source. In the example of FIG. 6, the smart appliance 606 with the light source is the enrollee and may not have WLAN communication capabilities. The mobile device 604 may not be plugged into a powerline socket (i.e., may not be connected to the PLC network) or may not have PLC capabilities. The mobile device 604 may act as an external registrar to enable the PLC-compatible enrollee 606 to connect to the PLC network governed by the hybrid access point 602. At stage A, on determining that the enrollee 606 should be added to the hybrid home network 600, the mobile device 604 (e.g., the communication unit 306 of FIG. 3) can transmit a "Start PLC handshake" WLAN signal 608 to the hybrid access point 602. In some embodiments, the mobile device 604 may have a priori knowledge that the enrollee 606 should be configured in the PLC network. By transmitting the WLAN signal 608, the mobile device 604 can notify the hybrid access point 602 of the presence of a PLC-compatible enrollee 606 and can indirectly prompt (via the hybrid access point 602) the PLC-compatible enrollee 606 to transmit sensor information to eventually configure the PLC-compatible enrollee 606 in the PLC network. In other embodiments, the mobile device 604 may not have a priori knowledge that the enrollee 606 should be configured in the PLC network. The mobile device 608 can transmit the WLAN signal 608 to the hybrid access point 602 (e.g., periodically, at a predetermined time instant, etc.) to indirectly prompt (via the hybrid access point 602) any PLC-compatible enrollee that wishes to be configured in the PLC network to transmit sensor information to the mobile device 604.

At stage B, the hybrid access point 602 can transmit (via the PLC network) a "Start handshake" PLC message 610 to the enrollee 606 and to other PLC devices in the PLC network. In one embodiment, the "Start handshake" PLC message 610 could be a broadcast message. Transmitting the "Start handshake" PLC message 610 may prompt all unconfigured devices to start transmitting their respective PIN via light sources. At stage C, in response to receiving the "Start handshake" PLC message 610, the enrollee 606 (e.g., a configuration unit) can begin to rapidly fluctuate the light source and generate the intensity waveform 612 that is representative of the enrollee's PLC key. At stage D, the mobile device 604 (e.g., the sensor unit 304 of FIG. 3) can detect the intensity waveform and, as described above with reference to FIG. 4, can decode the enrollee's PLC key from the intensity waveform 612. At stage E, the mobile device 604 can transmit the enrollee's PLC key to the hybrid access point 602 in a WLAN signal 614. At stage F, the hybrid access point 602 can use the enrollee's PLC key to communicate with the enrollee 606 and add the enrollee 606 to the PLC network. It should be noted that although FIG. 6 depicts the WLAN-compatible mobile device 604 determining the PLC key associated with the PLC-compatible smart appliance using Li-Fi technology, embodiments are not so limited. In other embodiments, the WLAN-compatible mobile device 604 can determine the PLC key associated with the PLC-compatible smart appliance using audio signals or other suitable sensor technologies (e.g., RFID, QR codes, etc.) to configure the PLC-compatible smart appliance in the PLC network. It is noted that if there are multiple PLC devices in the hybrid home network 600, the hybrid access point 602 may try to configure each device until successful.

Figure 7:
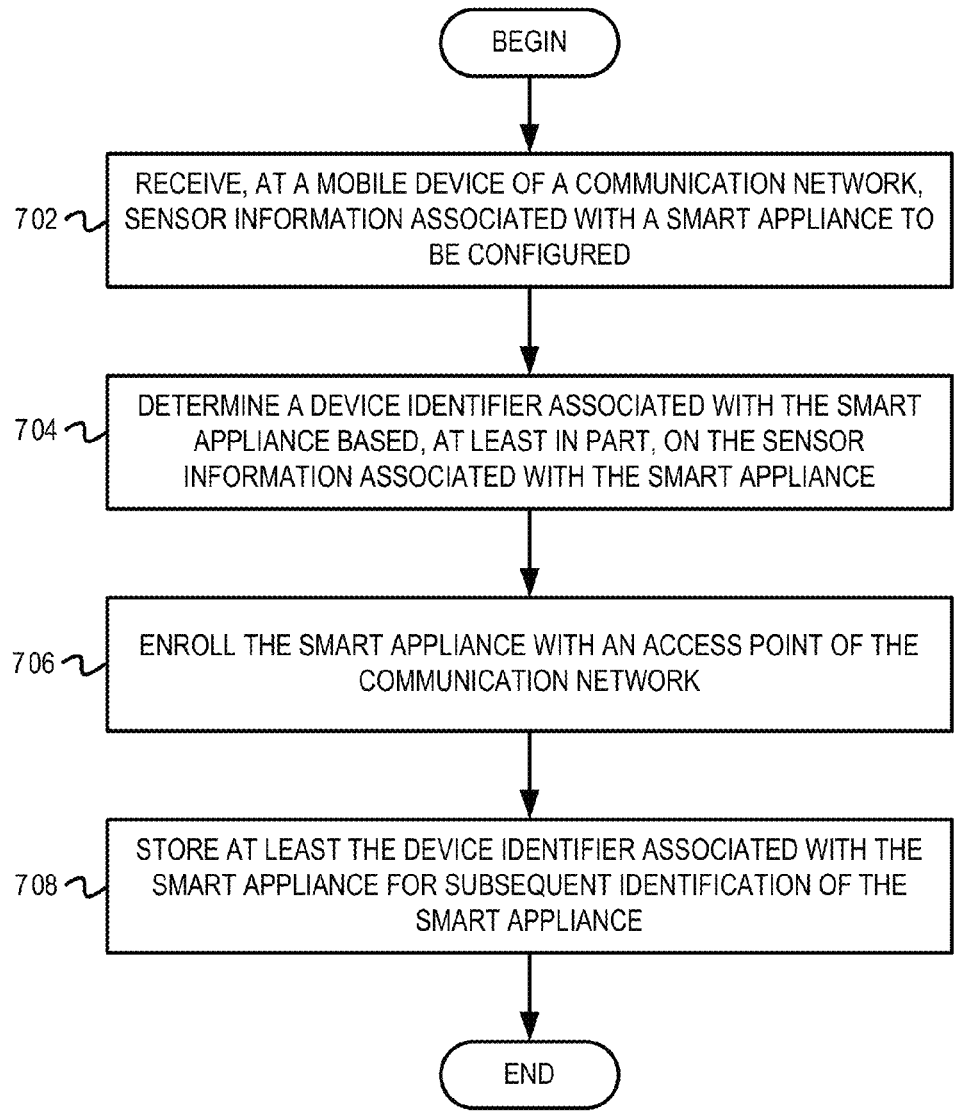
FIG. 7 is a flow diagram illustrating example operations of a sensor-based mechanism for configuring a smart appliance in a communication network.

FIG. 7 is a flow diagram ("flow") 700 illustrating example operations of a sensor-based mechanism for configuring a smart appliance in a communication network. The flow 700 begins at block 702.

At block 702, sensor information associated with a smart appliance is received at a mobile device of a communication network. As described above with reference to FIGS. 1-6, the mobile device can be a smartphone, a tablet computer, or other suitable handheld electronic device with sensors and communication capabilities. Referring to the example of FIG. 3, the sensor unit 304 of the mobile device 102 can receive sensor information (e.g., a light intensity waveform, an audio waveform, an RFID signal, etc.) that was transmitted by the smart appliance 106. In another embodiment, the sensor unit 304 may scan a QR code, a barcode, or another suitable encoded image associated with the smart appliance 106. In this embodiment, the scanned QR code, barcode, or another suitable encoded image can be the sensor information associated with the smart appliance 106. The flow continues at block 704.

At block 704, a device identifier associated with the smart appliance is determined based, at least in part, on the sensor information associated with the smart appliance. For example, as described above with reference to FIG. 4, the sensor unit 304 can decode the light intensity waveform received (using Li-Fi technology) from the smart appliance 106 to determine the PIN (and/or MAC ID, and/or other suitable device identifiers, and/or other suitable configuration information) associated with the smart appliance 106. As another example, as described above with reference to FIG. 5, the sensor unit 304 can decode the audio waveform received from the smart appliance 106 to determine the PIN (or other suitable device identifiers) associated with the smart appliance 106. The flow continues at block 706.

At block 706, the smart appliance is enrolled with an access point of the communication network. For example, after the sensor unit 304 decodes the smart appliance's PIN and/or other device identifiers (e.g., MAC ID), the communication unit 306 can enroll the smart appliance 106 with the access point 102 of the communication network 302. In some embodiments, the communication unit 306 can provide network credentials associated with the access point 102 (e.g., the SSID and WPA2 passphrase) to the smart appliance 106 to enable the smart appliance 106 to identify and communicate with the access point 102. The smart appliance 106 can use the SSID and the WPA2 passphrase information to locate, connect to, associate with, and communicate with the access point 102. In some embodiments, the communication unit 306 may also provide the PIN and/or other device identifiers of the smart appliance 106 to the access point 102. The flow continues at block 708.

At block 708, store at least the device identifier associated with the smart appliance for subsequent identification of the smart appliance. For example, after the smart appliance is enrolled in the communication network, the sensor unit 304 can store the device identifier associated with the smart appliance 106 (decoded at block 704), sensor information associated with the smart appliance 106 (received at block 702), a picture of the smart appliance 106, a position of the smart appliance 106 in the communication network 100, a position of the smart appliance 106 relative to one or more previously configured smart appliances, and/or other suitable information that can enable the mobile device 104 to easily identify the smart appliance 106 at a later date. From block 708, the flow ends.

Typically, before a smart appliance 106 can be controlled (e.g., before one or more operating parameters of the smart appliance 106 can be varied), service discovery procedures are executed to identify the smart appliance 106. The service discovery procedures can be simplified if the mobile device 104 can uniquely identify the smart appliance 106 that is to be controlled prior to requesting (e.g., from the access point 102) permission to connect to (and control) the desired smart appliance 106 as will be described below in FIGS. 8 and 9.

Figure 8:
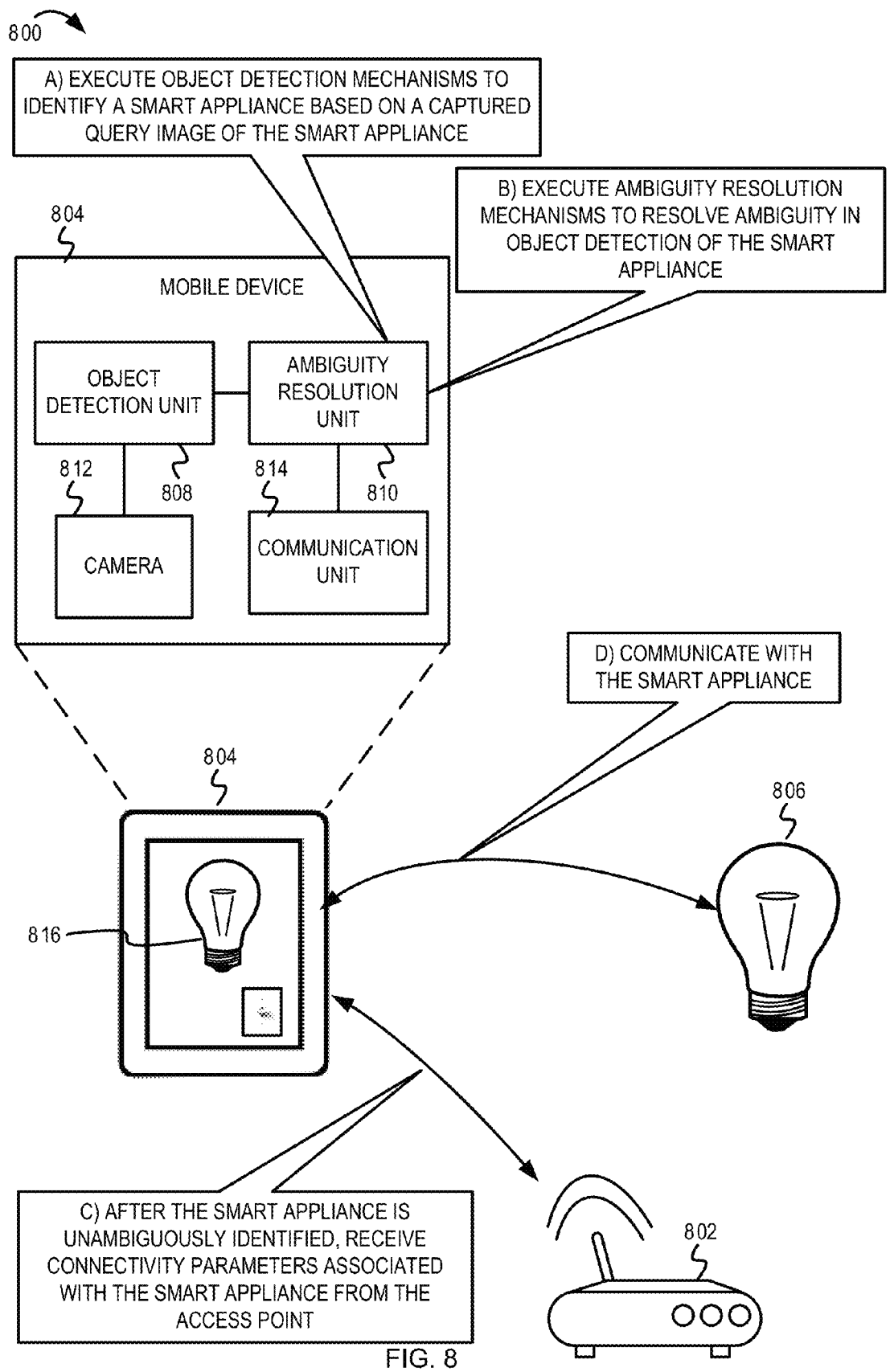
FIG. 8 is an example block diagram illustrating a mechanism for identifying and controlling a previously enrolled smart appliance.

FIG. 8 is a block diagram illustrating a mechanism for identifying and controlling a previously enrolled smart appliance. FIG. 8 depicts a home network 800 comprising a WLAN access point 802, a mobile device 804, and a smart appliance 806. The mobile device 804 comprises a camera 812, a communication unit 814, an object detection unit 808, and an ambiguity resolution unit 810. The mobile device 804 can execute operations described below in stages A-D to identify a previously-enrolled smart appliance, connect to the identified smart appliance, and control the smart appliance.

At stage A, the object detection unit 808 executes object detection mechanisms to identify a smart appliance 806 based on a captured picture (referred to as a "query image") of the smart appliance 806. For example, the camera 812 associated with the mobile device 804 can be used to take a picture 816 of the smart appliance 806 that the user wants to control. The mobile device 812 can employ device recognition techniques to identify the smart appliance 806 to be controlled ("target device") from the query image 816. The object detection unit 808 can execute suitable object detection algorithms to identify a class/type of the target device 806. For example, the object detection unit 808 can identify whether the target device 806 in the query image 816 is a doorknob, a light fixture, a refrigerator, etc. The object detection unit 808 can identify an object that is the closest to the target device 806 in the query image 816 (in terms of number of matches, correlation, etc.) by comparing the query image 816 to a database of previously enrolled smart appliances. The object detection unit 808 can execute a scale invariant feature transform (SIFT), speeded up robust features (SURF) algorithm, and/or other suitable object detection algorithms. Typically, the accuracy of the object detection algorithm can depend upon the size of the database and the content of the database. However, because similar objects may be positioned at different locations (e.g., the same type of smart light bulb may be installed at multiple locations within a user's house), the object detection algorithms may not be sufficient to unambiguously identify the target device 806. Therefore, the mobile device 804 may employ suitable ambiguity resolution mechanisms to uniquely identify the target device 806 from a plurality of potential target devices ("ambiguity set"), as will be described below.

At stage B, an ambiguity resolution unit 810 executes ambiguity resolution mechanisms to resolve ambiguity in object detection by using supplementary information. For example, the ambiguity resolution unit 810 can have access to a pre-existing map that is a two-dimensional representation of the floor plan of the home network 800 (e.g., a user's home). During the enrolling process, the pre-existing map can be augmented with information that indicates where the smart appliances are positioned. For example, the position of a smart television relative to a front door entrance can be stored as part of the map. In another embodiment, a three-dimensional representation map of a current environment (e.g., a home network) can be determined using computer vision techniques such as simultaneous localization and mapping (SLAM). For example, the map can be dynamically constructed as smart appliances are configured, enrolled, and added to the home network 800. The map may be dynamically updated as more information about the position of smart appliances is available and as smart appliances are added/removed from the home network 800. For example, a smart light bulb can be enrolled in the home network 800, a picture of the smart light bulb can be captured, the position of the smart light bulb can be determined, and the smart light bulb can be added to the map. Next, a smart doorknob can be enrolled in the home network 800 and a picture of the smart doorknob can be captured. Based on correlations between the pictures of the smart light bulb and the smart doorknob, it can be determined that the smart light bulb and the smart doorknob are proximate to each other. Accordingly, the smart doorknob can be positioned close to the smart light bulb on the map. The ambiguity resolution unit 810 can employ the two-dimensional map and/or the three-dimensional map for resolving ambiguity in object detection when the target device 806 is an "immovable device," such as a refrigerator, light bulb, doorknob, or other smart appliance that is not usually movable. Typically, the ambiguity resolution unit 810 may not employ the two-dimensional map and/or the three-dimensional map for resolving ambiguity when the target device 806 is a "movable device," such as a table fan, or other smart appliance that is easily movable.

In another embodiment, the ambiguity resolution unit 810 can employ location information for resolving ambiguity in object detection. For example, based on knowledge that the mobile device 804 (and hence, the user) is in the living room, the ambiguity resolution unit 810 may determine that there is a high possibility that the doorknob in the query image 816 is the doorknob on the main entrance. Location information can be determined using Wi-Fi positioning, vision based SLAM, and/or other suitable positioning techniques. The ambiguity resolution unit 810 can also use the location information to prune (or reduce) the size of the database against which the query image 816 is compared to maximize the likelihood for identifying a match for the target device 806 in the query image 816. In another embodiment, the ambiguity resolution unit 810 can employ sensor information for resolving ambiguity in object detection. For example, the ambiguity resolution unit 810 can use information from gyros, accelerometers, compass, or other suitable sensors associated with the mobile device 804 to identify the orientation of the target device 806 in the query image 816, the position of the user relative to the target device 806 in the query image 816, etc. The sensor information can be employed in conjunction with the location information to determine at least a rough estimate of the identity and/or the position of the target smart appliance 806. In another embodiment, the ambiguity resolution unit 810 can employ Wi-Fi positioning techniques (or other suitable positioning techniques) to estimate the target device 806 based on the user's position. For example, if the home network 800 comprises multiple access points, an estimate of the user's position (i.e., the position of the mobile device 804) can be determined based on information from the multiple access points. Accordingly, the target device 806 can be identified from the ambiguity set based on the estimate of the user's position.

In some embodiments, the ambiguity resolution unit 810 can use situational awareness for ambiguity resolution. The position of the user can be estimated based on signals from the user's mobile device 804, the time of day, the user's schedule, historical knowledge of the user's habits, etc. For example, the ambiguity resolution unit 810 may be "aware" that the user typically goes to bed at 10 pm. Accordingly, if it is determined that the user is trying to control a smart light bulb after 10 pm, the ambiguity resolution unit 810 can infer that the smart light bulb is probably in the user's bedroom.

In another embodiment, the ambiguity resolution unit 810 can use radio devices (e.g., communication units) associated with the smart appliances to resolve ambiguity after the ambiguity set is identified using object detection techniques (e.g., computer vision techniques) described at stage A. In this embodiment, the ambiguity resolution unit 810 can use the WLAN access point 802 to identify the target device 806 from the smart appliances in the ambiguity set. The ambiguity resolution unit 810 can provide information (e.g., device identifiers, device addresses, device images, etc.) associated with all of the smart appliances in the ambiguity set to the WLAN access point 802. The WLAN access point 802 can transmit a probe signal to each of the smart appliances in the ambiguity set requesting each of the identified smart appliances to transmit a radio beacon (or another unique radio signature/signal). The ambiguity resolution unit 810 can receive the radio beacons, determine the signal strength associated with each of the smart appliances in the ambiguity set, and use the signal strength (or signature) in conjunction with the supplementary information described above (e.g., the 2-dimensional maps, the 3-dimensional maps, sensor information, situational awareness, etc.) to identify/locate the target device 806 that is to be controlled.

It should be noted that in other embodiments, the ambiguity resolution unit 810 may not use the signal strength to identify/locate the target device 806 that is to be controlled. In some embodiments, each of the smart appliances in the ambiguity set can radiate a well-defined signature over a predetermined radio resource (e.g., in time, frequency, power, etc.). The ambiguity resolution unit 810 can use the detected radio signatures to identify/locate the target device 806 that is to be controlled. In another embodiment, the ambiguity resolution unit 810 can determine time of flight information from the radio beacons received from each of the smart appliances in the ambiguity set. The ambiguity resolution unit 810 can then estimate the time of flight associated with the target device 806 in its line of view and can attempt to identify the appropriate smart appliance to be controlled from the ambiguity set. It should be understood that PLC signals or other types of radio communication signals can be employed to identify the target device from the ambiguity set.

At stage C, after the target device 806 is unambiguously identified, connectivity parameters associated with the identified target device 806 are determined. In one embodiment, the communication unit 814 can transmit an identifier of the target device 806 to the access point 802 and can receive one or more connectivity parameters associated with the target device 806 from the access point 802. The connectivity parameters can include a service set identification (SSID), a basic service set identification (BSSID), authentication requirements, device credentials, payment/subscription information, device contact information, wireless technology being employed (e.g., WLAN, Bluetooth, etc.), information for network address translator (NAT) protocols (e.g., STUN/TURN server information), uniform resource indicators (URIs), device location, and/or other suitable device information. It should be noted that the connectivity parameters may be secured (e.g., password protected, encrypted, etc.). In another embodiment, after the ambiguity resolution unit 810 identifies the target device 806, the mobile device 804 can access a local (or remote) connectivity parameters database (or another suitable memory location or data structure) to determine one or more connectivity parameters associated with the target device 806. For example, after the target device 806 is unambiguously identified, the mobile device 804 may not connect to the access point 802 to determine how to communicate with the target device 806. Instead, the mobile device 804 may determine (without assistance from the access point 802) the PIN and/or other suitable connectivity parameters that can be used for communicating with the target device 806.

At stage D, the mobile device 804 communicates with the target device 806. In some embodiments, the mobile device 804 can connect to the target device 806 (e.g., a configuration unit of the target device 806) by setting up a direct peer-to-peer connection. In another embodiment, the mobile device 804 can communicate with the target device 806 via the wireless access point 802. In another embodiment, after the mobile device 804 identifies the target device 804, the mobile device 804 can access information about the previously enrolled smart appliances and can determine the PIN (or other information) associated with the target device 806. The mobile device 804 may then directly communicate with the target device 806 (using the PIN) instead of communicating via the access point 802. The mobile device 804 can transmit one or more commands to vary one or more operating parameters of the target device 806 and to accordingly control the operation of the target device 806.

Figure 9:
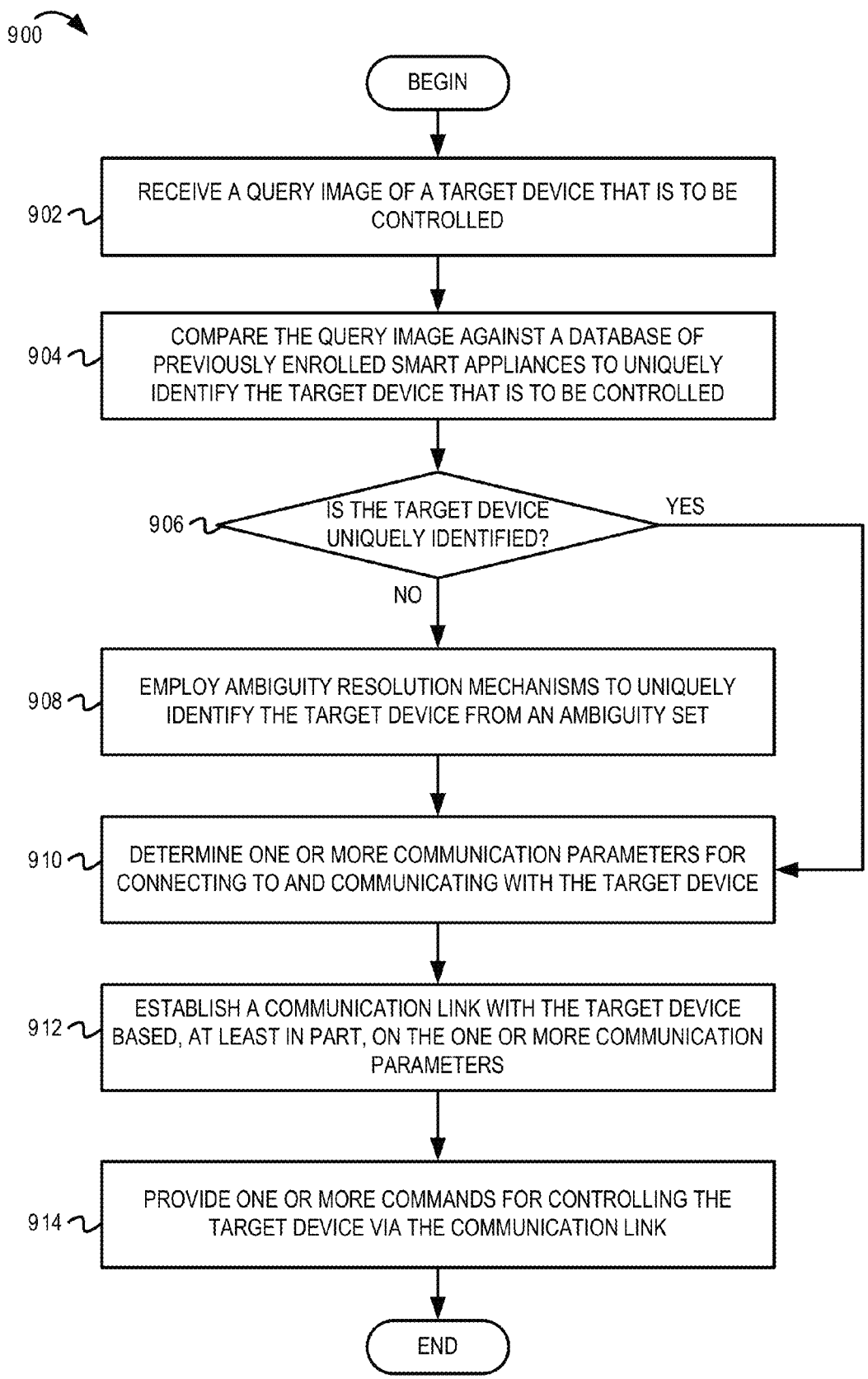
FIG. 9 is a flow diagram illustrating example operations for identifying and controlling a previously enrolled smart appliance.

FIG. 9 is a flow diagram 900 illustrating example operations for controlling a previously enrolled smart appliance. The flow diagram 900 begins at block 902.

At block 902, a query image of a target device that is to be controlled is received. Referring to the example of FIG. 8, a user can use a camera 812 associated with the mobile device 804 to take a picture 816 of a previously enrolled smart appliance 806 that the user wants to control. The query image 816 can be provided to an object detection unit 808. The flow continues at block 904.

At block 904, the query image is compared against a database of previously enrolled smart appliances to uniquely identify the target device that is to be controlled. For example, as described above in stage A of FIG. 8, the object detection unit 808 can compare the query image 816 against a database of previously enrolled smart appliances in an effort to uniquely identify the target device 806 that is to be controlled. The flow continues at block 906.

At block 906, it is determined whether the target device is uniquely identified. With reference to the example of FIG. 8, the object detection unit 808 can determine whether the target device 806 could be uniquely identified or whether an ambiguity set comprising a plurality of probable target devices was determined. If the target device 806 was uniquely identified, the flow continues at block 910. Otherwise, the flow continues at block 908.

At block 908, ambiguity resolution mechanisms are employed to uniquely identify the target device from an ambiguity set. With reference to the example of FIG. 8, an ambiguity resolution unit 810 can employ location information, sensor information, and/or radio signals to uniquely identify the target device 806 from an ambiguity set, as described above in stage B. After the target device 806 is unambiguously identified, the flow continues at block 910.

At block 910, one or more communication parameters are determined for connecting to and communicating with the target device. With reference to the example of FIG. 8, the communication unit 814 can determine one or more communication parameters for communicating with the target device 806. As described above, in some embodiments, the communication parameters associated with the target device 806 can be obtained from an access point 802 of the home network 800. In other embodiments, however, the mobile device 804 can determine the communication parameters associated with the target device 806 without assistance from the access point 802 and by accessing previously stored communication parameters. The flow continues at block 912.

At block 912, a communication link is established with the target device based, at least in part, on the one or more communication parameters. As described above in stages C and D of FIG. 8, the communication unit 814 can establish a communication link with the target device 806. In one example, the communication unit 804 can establish a direct communication link with the target device 806. In another example, the communication unit 804 can establish a communication link with the target device 806 via the access point 802. The flow continues at block 914.

At block 914, one or more commands for controlling the target device are provided via the communication link. With reference to the example of FIG. 8, the communication unit 814 can transmit one or more commands to vary one or more operating parameters of the target device 806 and to accordingly control the operation of the target device 806 (e.g., based on user input). From block 914, the flow ends.

It should be understood that FIGS. 1-9 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. It should be understood that although examples refer to a smartphone being used to enroll a smart appliance in the home network and to control an enrolled smart appliance, embodiments are not so limited. In other embodiments, another suitable electronic device (e.g., a tablet computer) that has user input capabilities and appropriate sensors (e.g., a camera, microphone, NFC detector, infrared signal detector, barcode scanner, etc.) to capture the information transmitted by the smart appliance can be employed.

Although FIGS. 4-6 describe light signals and audio signals being used to indicate and decode the enrollee's PIN (or other suitable device identifiers) for establishing a communication link between the mobile device and the enrollee, embodiments are not so limited. In other embodiments, the enrollee and the mobile device can employ other suitable out-of-band communication technologies (e.g., barcodes, Wi-Fi direct, Near-Field Communication (NFC), RFID tags, etc.) for transmitting/decoding the enrollee's PIN to establish the communication link. For example, NFC technology can be used to exchange the PIN between the enrollee and the mobile device. An NFC chip may be embedded in the enrollee and an NFC detector may be embedded in the mobile device. When the mobile device is moved within a configurable threshold distance of the enrollee, the mobile device's NFC detector can detect one or more NFC signals transmitted by the enrollee's NFC chip. The NFC detector can decode the NFC signals, decode the enrollee's PIN, and establish a binding between the enrollee and the mobile device. As another example, the enrollee may comprise a barcode, a quick response (QR) code, an encoded image, or another suitable type of code. The mobile device may comprise a suitable barcode (or QR code) scanner/reader (e.g., using the camera). The user can use the mobile device to read the barcode (or QR code) on the enrollee, decode the barcode (or QR code) to determine the enrollee's PIN associated with the enrollee. Likewise, with reference to the hybrid network 600 of FIG. 6, the enrollee 606 can employ another suitable communication technology (e.g., ultrasound technology, barcodes, NFC, etc.) to transmit its PLC key to the mobile device. The mobile device can employ a corresponding suitable sensor mechanism (e.g., a microphone, a barcode scanner, an NFC reader, etc.) to detect and decode the enrollee's PLC key.

Although FIGS. 1-6 describe the mobile device providing device credentials associated with the access point (e.g., SSID, WPA2 passphrase information, etc.) to the enrollee to enable the enrollee to connect to the home network via the access point, embodiments are not so limited. In other embodiments, after the mobile device establishes a binding with the enrollee and decodes the enrollee's PIN, the mobile device can directly add the enrollee to the home network. Furthermore, after the enrollee is added to the home network, information about the enrolled device can be stored (e.g., at a central network coordinator, at the access point, on the mobile device, etc.) for subsequent use. For example, a picture of the enrolled device, services provided by the enrolled device, a position of the enrolled device in the home network, a PIN (or PLC key) associated with the enrolled device, sensor information (e.g., a picture of the QR code 107 of FIG. 1, the light intensity waveform of FIG. 4, the audio waveform of FIG. 5, etc.) provided by the enrolled device, etc. can be stored for subsequent identification of the enrolled device. It should also be understood that the mobile device may not comprise a priori information on how to decode the PIN from the information received from the enrollee (e.g., the intensity waveform, the audio waveform, etc.). The mobile device may download suitable applications and functionality for decoding the enrollee's PIN depending on the type of input information (e.g., depending on whether the information was detected by the camera, microphone, etc.). For example, the enrollee manufacturer can offer a downloadable application that can be used by the mobile device to process and decode the enrollee's PIN. In some embodiments, after the smart appliance is enrolled in the network (e.g., after the smart appliance is configured and added to the network) the mobile device (e.g., a smartphone, a tablet computer, etc.) can enable the user to connect to and control the smart appliance (e.g., a web-controlled light bulb, a smart doorknob, etc.) as described in FIGS. 8 and 9.

In some embodiments, as described above, a suitable sensor associated with the mobile device (e.g., a camera, a microphone, etc.) can be used to record sensor information (e.g., light impulses, ultrasound audio data, infrared signals, etc.) received from the smart appliance. The PIN that is decoded from the received sensor information can be compared against previously stored PIN values (obtained during configuration of the smart appliance) to identify the smart appliance that is to be controlled. Alternately, the received sensor information can be directly compared against previously stored sensor information that was obtained during configuration of the smart appliance to identify the smart appliance that is to be controlled.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
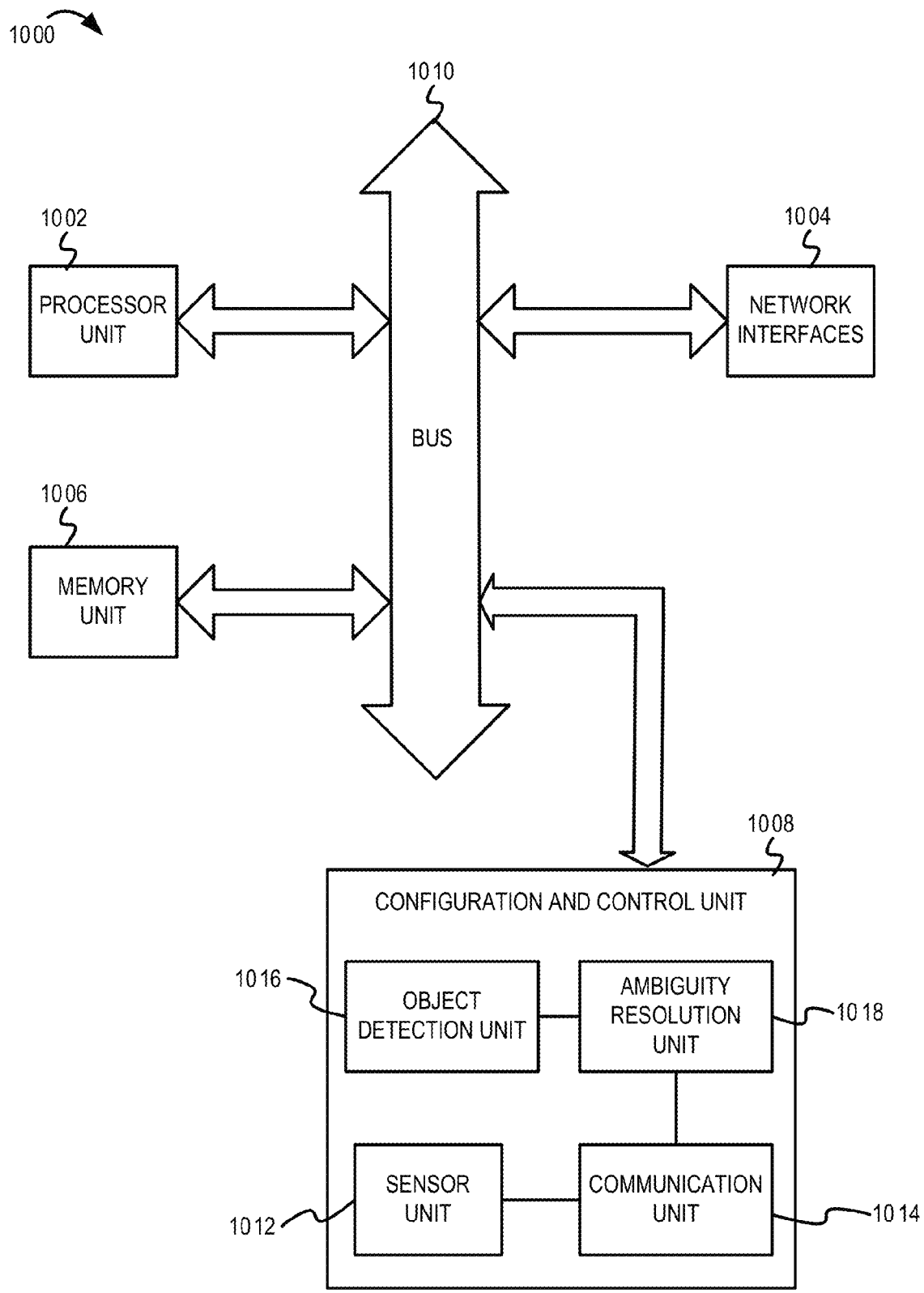
FIG. 10 is a block diagram of one embodiment of an electronic device including a sensor-based mechanism for configuring and controlling smart appliances.

FIG. 10 is a block diagram of one embodiment of an electronic device 1000 including a sensor-based mechanism for configuring and controlling smart appliances. In some implementations, the electronic device 1000 may be one of a laptop computer, a tablet computer, a mobile phone, a smart appliance, a powerline communication device, a gaming console, or other mobile electronic systems with wireless communication capabilities. The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 also includes a bus 1010 (e.g., PCI, ISA, PCI-Express, HyperTransport®, InfiniBand®, NuBus, AHB, AXI, etc.), and network interfaces 1004 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, an Ethernet interface, etc.).

The electronic device 1000 also includes a configuration and control unit 1008. The configuration and control unit 1008 comprises a sensor unit 1012, a communication unit 1014, an object detection unit 1016, and an ambiguity resolution unit 1018. The sensor unit 1012, in conjunction with the communication unit 1014, can execute functionality to detect sensor information associated with a smart appliance, determine a device identifier associated with the smart appliance based on decoding the sensor information, and configure the smart appliance using the device identifier, as described above with reference to FIGS. 1-7. The object detection unit 1016, the ambiguity resolution unit 1018, and the communication unit 1014, in conjunction, can unambiguously identify the smart appliance to be controlled, establish a communication link with the identified smart appliance, and transmit one or more commands to control the smart appliance, as described above with reference to FIGS. 8 and 9. Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, the memory unit 1006, and the network interfaces 1004 are coupled to the bus 1010. Although illustrated as being coupled to the bus 1010, the memory unit 1006 may be coupled to the processor unit 1002.

While the embodiments are described with reference to various implementations and exploitations, it will be understood that these embodiments are illustrative and that the scope of the inventive subject matter is not limited to them. In general, techniques for sensor-based configuration and control of network devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for configuring a network device comprising:
detecting, via a sensor of a mobile device, sensor information from the network device, wherein the sensor information indicates device configuration information associated with the network device;
decoding the sensor information detected from the network device;
determining, via the mobile device, the device configuration information based at least in part on the decoding the sensor information;
establishing, based at least in part on the device configuration information, a first communication link with the network device;
providing, from the mobile device to the network device via the first communication link, network credentials associated with an access point of a communication network to configure the network device to communicatively couple to the communication network via the access point;
storing, at the mobile device, the device configuration information associated with the network device;
identifying the network device from a plurality of previously enrolled network devices based at least in part on the device configuration information;
determining a communication parameter associated with the network device to establish a second communication link with the network device after identifying the network device; and
providing a command from the mobile device to the network device to vary an operating parameter of the network device after establishing the second communication link with the network device.

2. The method of claim 1, wherein, if the network device is configured to provide sensor information associated with the device configuration information using a light source, said detecting the sensor information from the network device comprises one of:
detecting, using a light sensor associated with the mobile device, a light waveform from the network device, wherein a rate of fluctuation of the light waveform generated by the light source varies in accordance with the device configuration information, or
detecting, using the light sensor associated with the mobile device, the light waveform from the network device, wherein an intensity of the light waveform generated by the light source varies in accordance with the device configuration information.

3. The method of claim 2, wherein said decoding the device configuration information based on the sensor information detected from the network device comprises:
detecting a variation in light intensity based on analyzing the light waveform received from the network device; and
decoding the device configuration information based on the detected variation in the light intensity of the light waveform.

4. The method of claim 1, wherein, if the network device is configured to provide sensor information associated with the device configuration information using an audio generator, said detecting the sensor information from the network device comprises:
detecting, using an audio sensor associated with the mobile device, an audio waveform from the network device, wherein at least one parameter of the audio waveform varies in accordance with the device configuration information.

5. The method of claim 4, wherein the at least one parameter of the audio waveform comprises one or more of an amplitude of the audio waveform, a frequency of the audio waveform, and a phase of the audio waveform.

6. The method of claim 4, wherein said decoding the device configuration information based on the sensor information detected from the network device comprises:
detecting a variation in the at least one parameter of the audio waveform based on analyzing the audio waveform received from the network device; and
decoding the device configuration information based on the detected variation in the at least one parameter of the audio waveform.

7. The method of claim 1, wherein, when the device configuration information is encoded in a first code associated with the network device, said detecting the sensor information and determining the device configuration information comprises:
detecting, using a scanner of the mobile device, the first code associated with the network device; and
determining the device configuration information based at least in part on decoding the first code.

8. The method of claim 1, wherein, when the device configuration information is encoded in a first code associated with the network device, said detecting the sensor information and determining the device configuration information comprises:
capturing, using a camera of the mobile device, an image of the first code associated with the network device; and
determining the device configuration information based at least in part on decoding the captured image of the first code.

9. The method of claim 1, wherein the sensor information is at least one member of a group consisting of a near field communication (NFC) signal, a barcode, a quick response (QR) code, a radio frequency identifier (RFID) signal, and an encoded image.

10. The method of claim 1, wherein the mobile device is a mobile phone, a notebook computer, a wearable computer, or a tablet computer.

11. The method of claim 1, further comprising:
storing, at the mobile device, at least one member of a group consisting of an image of the network device, a position of the network device relative to one or more fixed positions in the communication network, a position of the network device relative to one or more previously enrolled network devices, the device configuration information, and the sensor information.

12. The method of claim 1, further comprises:
exchanging one or more handshake messages with the network device to determine a format for receiving the device configuration information at the mobile device from the network device; and
downloading, based at least in part on the one or more handshake messages, an application at the mobile device that is used to decode the sensor information received from the network device to determine the device configuration information.

13. The method of claim 1, wherein the device configuration information comprises at least one member of a group consisting of a medium access control (MAC) identifier and a personal identification number (PIN).

14. The method of claim 1, wherein the identifying the network device from the plurality of previously enrolled network devices comprises:
  capturing, at the mobile device, a query image that comprises the network device; and
  identifying the network device from the plurality of previously enrolled network devices based, at least in part, on the captured query image.

15. The method of claim 14, wherein said identifying the network device from the plurality of previously enrolled network devices based, at least in part, on the captured query image comprises:
  comparing the query image against images of the plurality of previously enrolled network devices in a predetermined database associated with the mobile device;
  determining that a correlation between a first of the plurality of previously enrolled network devices and the query image exceeds a correlation threshold; and
  selecting the first of the plurality of previously enrolled network devices as the network device that is associated with one or more operating parameters to be varied.

16. The method of claim 14, further comprising:
  determining that a correlation between the query image and two or more of the plurality of previously enrolled network devices exceed a correlation threshold; and
  executing ambiguity resolution operations for selecting a first of the two or more of the plurality of previously enrolled network devices as the network device.

17. The method of claim 16, wherein said executing ambiguity resolution operations comprises at least one of:
  selecting the first of the two or more of the plurality of previously enrolled network devices as the network device based, at least in part, on a map that indicates a position of the plurality of previously enrolled network devices within the communication network, wherein the map is one of a two-dimensional map and a three-dimensional map,
  selecting the first of the two or more of the plurality of previously enrolled network devices as the network device based, at least in part, on a current position of the mobile device within the communication network,
  selecting the first of the two or more of the plurality of previously enrolled network devices as the network device based, at least in part, on a time of day and schedule information associated with a user of the mobile device,
  selecting the first of the two or more of the plurality of previously enrolled network devices as the network device based on at least one of user context and user behavior, and
  selecting the first of the two or more of the plurality of previously enrolled network devices as the network device based on analyzing time of flight information associated with each of the two or more of the plurality of previously enrolled network devices.

18. The method of claim 16, wherein said executing the ambiguity resolution operations comprises:
  transmitting, to the access point associated with the communication network, an indication of the two or more of the plurality of previously enrolled network devices;
  receiving, from each of the two or more of the plurality of previously enrolled network devices, a radio signature that is indicative of the network device; and
  selecting the first of the two or more of the plurality of previously enrolled network devices as the network device based, at least in part, on the radio signature received from each of a subset of the plurality of previously enrolled the network devices.

19. The method of claim 1, further comprising:
  providing, from the mobile device to the access point, the device configuration information associated with the network device.

20. A method comprising:
  determining, at a mobile device, to configure a network device in a communication network;
  detecting, at a sensor associated with the mobile device, sensor information from the network device, wherein the sensor information is indicative of configuration information associated with the network device;
  decoding the configuration information based on the sensor information detected from the network device;
  establishing, based at least in part on the configuration information, a first communication link with the network device;
  enrolling the network device in the communication network by providing, from the mobile device to the network device via the first communication link, network credentials associated with an access point of the communication network;
  determining that one or more operating parameters of the network device are to be varied after said enrolling the network device in the communication network;
  capturing, at the mobile device, a query image that comprises the network device;
  identifying the network device from a plurality of network devices based, at least in part, on the captured query image;
  determining one or more communication parameters associated with the network device for varying the one or more operating parameters of the network device; and
  establishing a second communication link with the network device for providing one or more commands to vary the one or more operating parameters of the network device based, at least in part, on the one or more communication parameters associated with the network device.

21. The method of claim 20, wherein the sensor information is at least one of a light signal, an audio signal, an ultrasound signal, an infrared signal, a near field communication (NFC) signal, a barcode, a quick response (QR) code, radio frequency identifier (RFID) signal, a wireless local area network (WLAN) signal, and a powerline communication (PLC) signal.

22. The method of claim 20, wherein said identifying the network device from the plurality of network devices based, at least in part, on the captured query image comprises:
  comparing the query image against images of the plurality of network devices in a predetermined database associated with the mobile device;
  determining that a correlation between a first of the plurality of network devices and the query image exceeds a correlation threshold; and
  selecting the first of the plurality of network devices as the network device that is associated with the one or more operating parameters to be varied.

23. The method of claim 22, wherein, in response to determining that the correlation between the query image and two or more of the plurality of network devices exceed the correlation threshold, the method further comprises at least one of:
  selecting a first of the two or more of the plurality of network devices as the network device that is associated with the one or more operating parameters to be varied based, at least in part, on a map that indicates a position of the plurality of network devices within the communication network, wherein the map is a two-dimensional map or a three-dimensional map, selecting the first of the two or more of the plurality of network devices as the network device that is associated with the one or more operating parameters to be varied based, at least in part, on a current position of the mobile device within the communication network, selecting the first of the two or more of the plurality of network devices as the network device that is associated with the one or more operating parameters to be varied based, at least in part, on a time of day and schedule information associated with a user of the mobile device, selecting the first of the two or more of the plurality of network devices as the network device that is associated with the one or more operating parameters to be varied based on at least one of user context and user behavior, or selecting the first of the two or more of the plurality of network devices as the network device that is associated with the one or more operating parameters to be varied based on analyzing time of flight information associated with each of the two or more of the plurality of network devices.

24. A mobile device comprising:
a processor; and
a memory to store instructions, which when executed by the processor, cause the mobile device to:
  detect, via a sensor of the mobile device, sensor information from a network device, wherein the sensor information indicates device configuration information associated with the network device;
  decode the sensor information detected from the network device;
  determine, via the mobile device, the device configuration information based at least in part on the decoding the sensor information;
  establish, based at least in part on the device configuration information, a first communication link with the network device;
  provide, from the mobile device to the network device via the first communication link, network credentials associated with an access point of a communication network to configure the network device to communicatively couple to the communication network via the access point;
  store, at the mobile device, the device configuration information associated with the network device;
  identify the network device from a plurality of previously enrolled network devices based at least in part on the device configuration information;
  determine a communication parameter associated with the network device to establish a second communication link with the network device after identifying the network device; and
  provide a command from the mobile device to the network device to vary an operating parameter of the network device after establishing the second communication link with the network device.

25. The mobile device of claim 24, wherein, if the network device is configured to provide sensor information associated with the device configuration information using a light source,
  the instructions that cause the mobile device to detect the sensor information from the network device comprise one of:
    instructions that cause the mobile device to detect, using a light sensor associated with the mobile device, a light waveform from the network device, wherein a rate of fluctuation of the light waveform generated by the light source varies in accordance with the device configuration information, or
    instructions that cause the mobile device to detect, using the light sensor associated with the mobile device, the light waveform from the network device, wherein an intensity of the light waveform generated by the light source varies in accordance with the device configuration information; and
  the instructions that cause the mobile device to decode the device configuration information based on the sensor information detected from the network device comprise instructions that cause the mobile device to:
    detect a variation in light intensity based on analyzing the light waveform received from the network device; and
    decode the device configuration information based on the detected variation in the light intensity of the light waveform.

26. The mobile device of claim 24, wherein, if the network device is configured to provide sensor information associated with the device configuration information using an audio generator,
  the instructions that cause the mobile device to detect the sensor information from the network device comprise instructions that cause the mobile device to:
    detect, using an audio sensor associated with the mobile device, an audio waveform from the network device, wherein at least one parameter of the audio waveform varies in accordance with the device configuration information; and
  the instructions that cause the mobile device to decode the device configuration information based on the sensor information detected from the network device comprise instructions that cause the mobile device to:
    detect a variation in the at least one parameter of the audio waveform based on analyzing the audio waveform received from the network device; and
    decode the device configuration information based on the detected variation in the at least one parameter of the audio waveform.

27. The mobile device of claim 24, wherein, when the device configuration information is encoded in a first code associated with the network device, the instructions that cause the mobile device to detect the sensor information and determine the device configuration information comprise instructions that cause the mobile device to:
  detect, using a scanner, the first code from the network device;
  decode the first code detected from the network device; and
  determine the device configuration information based at least in part on the decoded first code.

28. The mobile device of claim 24, wherein, when the device configuration information is encoded in a first code associated with the network device, the instructions that cause the mobile device to detect the sensor information and determine the device configuration information comprise instructions that cause the mobile device to:
  capture, using a camera, an image of the first code from the network device;
  decode the image of the first code captured from the network device; and
  determine the device configuration information based at least in part on the decoded image of the first code.

29. The mobile device of claim 24, wherein the instructions, which when executed by the processor, further cause the mobile device to:
  exchange one or more handshake messages with the network device to determine a format for receiving the device configuration information from the network device; and
  download, based at least in part on the one or more handshake messages, an application that is used to decode the sensor information received from the network device to determine the device configuration information.

30. A non-transitory machine-readable storage medium having instructions stored therein, which when executed by one or more processors of a mobile device cause the mobile device to:
  detect, via a sensor of a mobile device, sensor information from a network device, wherein the sensor information indicates device configuration information associated with the network device;
  decode the sensor information detected from the network device;
  determine, via the mobile device, the device configuration information based at least in part on the decoding the sensor information;
  establish, based at least in part on the device configuration information, a first communication link with the network device;
  provide, from the mobile device to the network device via the first communication link, network credentials associated with an access point of a communication network to configure the network device to communicatively couple to the communication network via the access point;
  store, at the mobile device, the device configuration information associated with the network device;
  identify the network device from a plurality of previously enrolled network devices based at least in part on the device configuration information;
  determine a communication parameter associated with the network device to establish a second communication link with the network device after identifying the network device; and
  provide a command from the mobile device to the network device to vary an operating parameter of the network device after establishing the second communication link with the network device.

31. The non-transitory machine-readable storage medium of claim 30, wherein, if the network device is configured to provide sensor information associated with the device configuration information using an audio generator,
  the instructions that cause the mobile device to detect the sensor information from the network device comprise instructions that cause the mobile device to:
    detect, using an audio sensor associated with the mobile device, an audio waveform from the network device, wherein at least one parameter of the audio waveform varies in accordance with the device configuration information; and
  the instructions that cause the mobile device to decode the device configuration information based on the sensor information detected from the network device comprise instructions that cause the mobile device to:
    detect a variation in the at least one parameter of the audio waveform based on analyzing the audio waveform received from the network device; and
    decode the device configuration information based on the detected variation in the at least one parameter of the audio waveform.

32. The non-transitory machine-readable storage medium of claim 30, wherein, when the device configuration information is encoded in a first code associated with the network device, the instructions that cause the mobile device to detect the sensor information and determine the device configuration information comprise instructions that cause the mobile device to:
  detect, using a scanner, the first code from the network device;
  decode the first code detected from the network device; and
  determine the device configuration information based at least in part on the decoded first code.

33. The non-transitory machine-readable storage medium of claim 30, wherein, when the device configuration information is encoded in a first code associated with the network device, the instructions that cause the mobile device to detect the sensor information and determine the device configuration information comprise instructions that cause the mobile device to:
  capture, using a camera, an image of the first code from the network device;
  decode the image of the first code captured from the network device; and
  determine the device configuration information based at least in part on the decoded image of the first code.

34. The non-transitory machine-readable storage medium of claim 30, wherein the instructions further comprise instructions that cause the mobile device to:
  exchange one or more handshake messages with the network device to determine a format for receiving the device configuration information from the network device; and
  download, based at least in part on the one or more handshake messages, an application that is used to decode the sensor information received from the network device to determine the device configuration information.

35. A network device comprising:
  a processor; and
  a memory to store instructions, which when executed by the processor, cause the network device to:
    detect an advertising message from a mobile device of a communication network;
    provide sensor information that is indicative of device configuration information associated with the network device to the mobile device after detection of the advertising message;
    establish, based at least in part on the device configuration information, a communication link with the mobile device;
    receive, from the mobile device via the communication link, network credentials associated with an access point of the communication network after providing the sensor information to the mobile device;
    configure the network device to communicatively couple to the communication network via the access point using the network credentials;
    receive, from the mobile device via the communication link, a command to vary an operating parameter of the network device; and
    varying the operating parameter based, at least in part, on the command.

36. The network device of claim 35, wherein the advertising message is a beacon message.

37. The network device of claim 35, wherein the sensor information comprises at least one member of a group consisting of:
a near field communication (NFC) signal, a barcode, a quick response (QR) code, a radio frequency identifier (RFID) signal, and an encoded image.

38. The network device of claim 35, wherein the device configuration information comprises at least one member of a group consisting of a medium access control (MAC) identifier and a personal identification number (PIN).

39. The network device of claim 35, wherein the network credentials comprise at least one member of a group consisting of a service set identifier (SSID) and Wi-Fi protected access 2 (WPA2) passphrase.

* * * * *